Nov. 14, 1961    K. L. WESTERCAMP    3,008,743
BALL JOINT

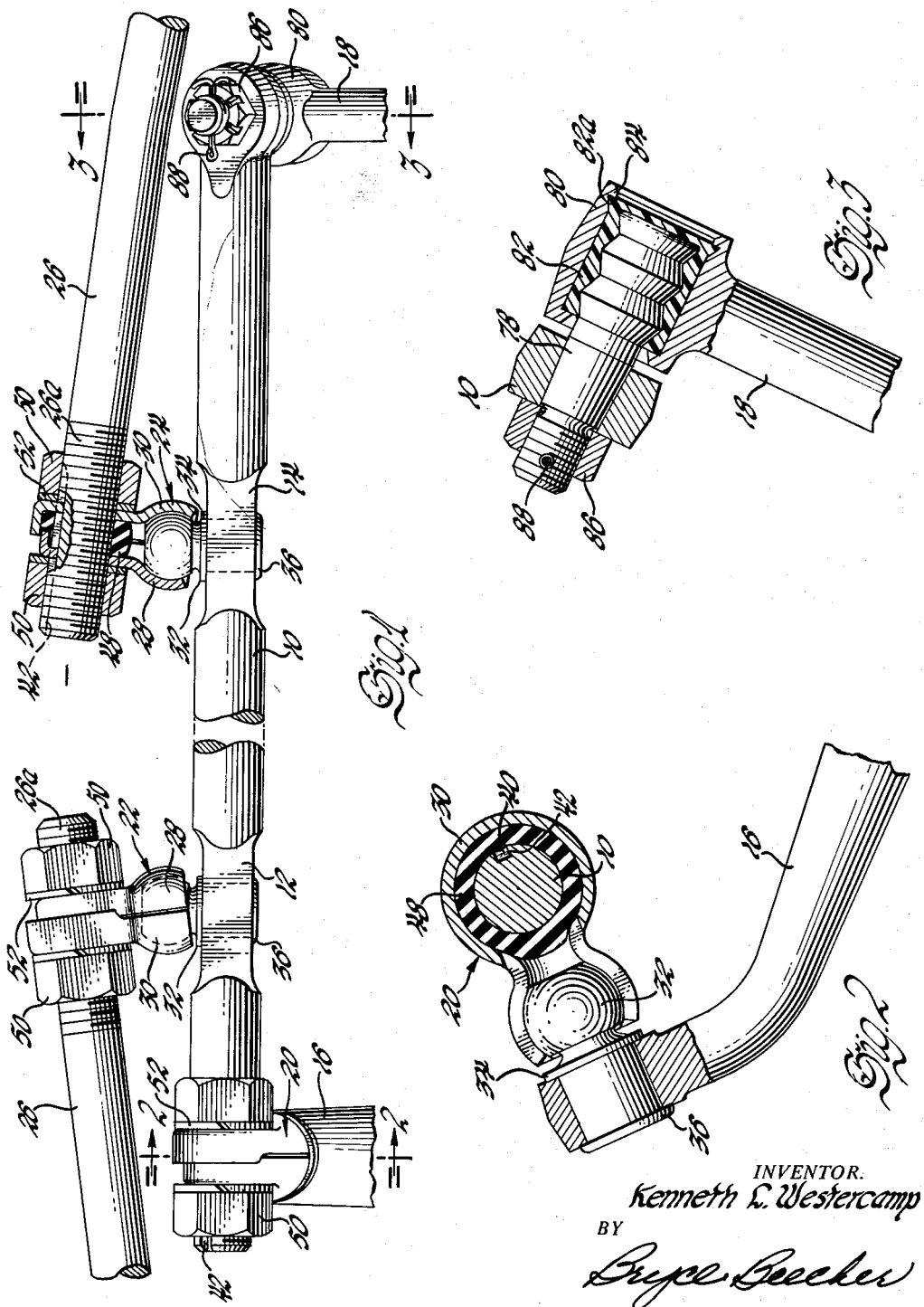

Filed Jan. 28, 1960    2 Sheets-Sheet 2

INVENTOR.
Kenneth L. Westercamp
BY
Bryce Beecher
ATTORNEY

United States Patent Office 3,008,743
Patented Nov. 14, 1961

3,008,743
BALL JOINT
Kenneth L. Westercamp, Saginaw, Mich., assignor to General Motors Corporation, Detroit, Mich., a corporation of Delaware
Filed Jan. 28, 1960, Ser. No. 5,232
10 Claims. (Cl. 287—90)

This invention relates to a ball joint construction whereby a pair of linkage members or the like may be interconnected in a manner permitting limited universal movement therebetween. The joint is considered particularly valuable as applied in steering linkages, especially those constituted of solid forged links, but is not limited thereto.

In the case of steering linkages so constituted, it has been the practice heretofore to form the ball sockets as part of the forging operation which is thus made undesirably involved. The present invention dispenses with the need for this and makes possible the use of substantially straight forged links as opposed to the conventionally employed bent links which are relatively weak.

Preferred embodiments of the invention are illustrated by the accompanying drawings to which reference will be made in the further description. In the drawings:

FIGURE 1 is a fragmentary plan view of a typical parallelogram linkage incorporating the invention, certain parts being shown in section;

FIGURE 2 is a view taken on the line 2—2 in FIGURE 1;

FIGURE 3 is a view taken on the line 3—3 in FIGURE 1;

Figure 4:
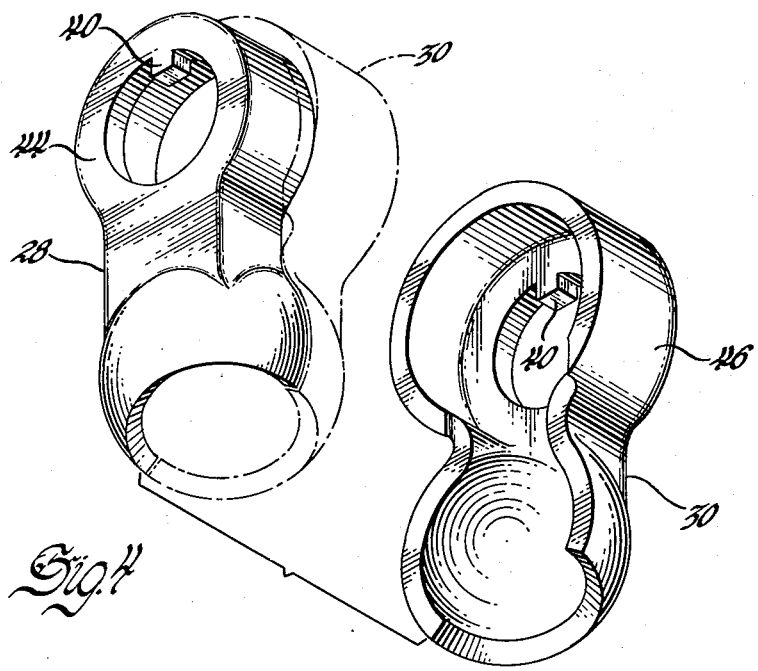
FIGURE 4 is an exploded perspective view of two coacting parts comprised in the joint.

Referring first to FIGURE 1, the numeral 10 denotes the intermediate rod component of the parallelogram linkage, such rod being flatted at 12 and 14. The rod is supported at one end by a pitman arm 16 and at its other end by an idler arm 18, the latter being suitably connected to the vehicle frame, not shown.

It will be understood that the pitman arm 16, with the linkage installed in the vehicle, is made fast to the output shaft of the steering gear assembly, not shown.

Three of the joints comprised in the illustrated linkage accord with the invention, these being of identical construction and being respectively denoted by the numerals 20, 22 and 24. Joint 20 provides the connection between the pitman arm 16 and the intermediate rod 10, while joints 22 and 24 connect such rod with tie rods 26 which are adapted at their outer ends, not shown, for connection to steering knuckle arms through which the dirigible wheels of the vehicle are actuated. The inner end portions 26a of the rods 26 will be noted as threaded.

Each of the joints 20, 22 and 24 comprises a pair of elements 28 and 30 complementarily formed to provide a socket for reception of the ball portion of a ball stud 32. In the case of the joints 22 and 24, the ball studs 32 are secured in the flatted portions 12 and 14 of the intermediate rod 10, while in the case of the joint 20 the ball stud is secured in the pitman arm at the end thereof which is made suitably flat. Each stud will be noted as having an annular rib 34 immediately below the ball head and a second annular rib 36 formed by swaging. The portion of the stud between the two ribs has a press fit in the part carrying the stud.

FIGURE 4 best illustrates the nature of the elements 28 and 30, each of which will be observed as having a tang 40 operating to prevent angular displacement of the element relative to the rod by which it is carried. The tang is accommodated in a slot in the rod, such slot in the case of the right hand tie rod (26) being denoted by the numeral 42.

The upper portions 44 and 46 of the elements 28 and 30 are cup-like in conformation, with portion 46 dimensioned to telescopically receive portion 44. A resilient spacer 48 (FIGURES 1 and 2) encircling the rod is retained between the portions 44 and 46 in a compressed state. This spacer provides for some flexibility in the ball socket, desirable as preventing deformation or distortion of the socket parts from sudden shocks. Loosening of the nuts 50 is prevented by lock washers 52.

Figure 5:
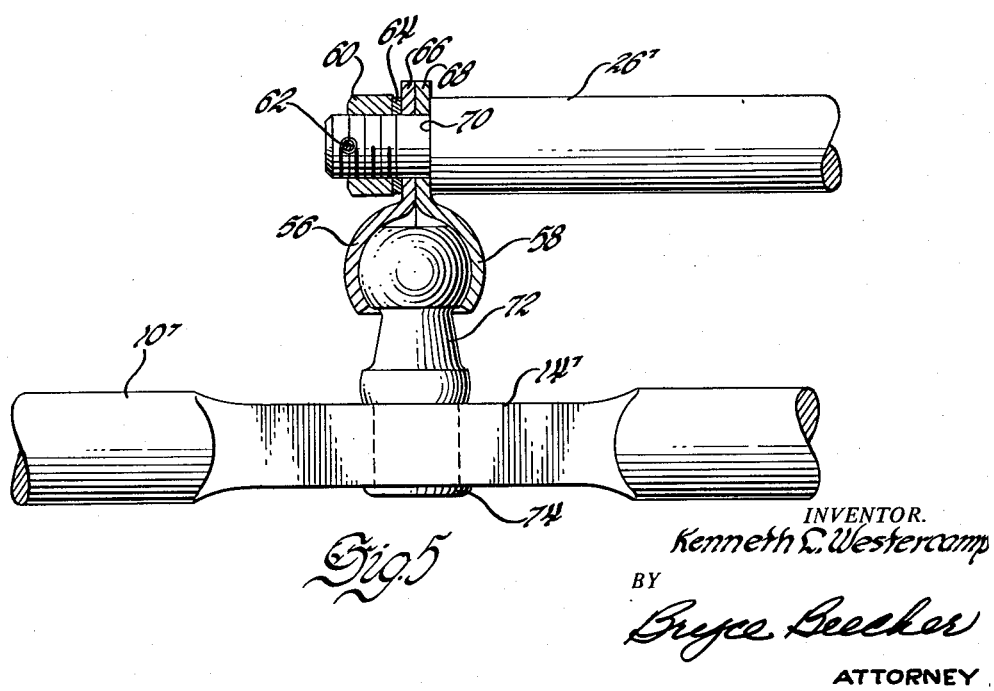
FIGURE 5 illustrates a modification.

FIGURE 5 shows a construction which omits the compressible washer. In this instance, dependency is placed on the natural resiliency of the metal of which the socket-providing members 56 and 58 are formed. These parts are made fast to the tie rod 26' by means of a nut 60 threaded on the reduced end of the rod and secured in place by a cotter pin 62. The flat ring portions 66, 68 of the socket-providing members are spaced from the bolt by a metal washer 64, with the inner face of the portion 68 abutting the annular wall 70 of the tie rod. Ball stud 72 is secured in the flat portion 14' of the intermediate rod 10' by swaging 74. Preferably, the stud has a press fit in the tie rod.

As indicated by FIGURE 3, the joint between the idler arm 18 and the tie rod 10 is most suitably of a nature such that the joint is capable of taking thrust in the direction normal to the axis of the intermediate rod 10. Thus, that portion of the stud 78 within the eye 80 of the idler arm is serrated to increase the area of its engagement with the plastic bushing 82 within which the stud rotates. Bushing 82 will be noted as having an end portion 82a which seats in an annular recess formed in the inner wall of the eye 80, retention of the bushing within the eye being thus assured. The recess is formed by peening-over of the metal material 84.

A nut 86 threaded on the stud 78 to secure it to the rod 10 is prevented from backing off by a cotter pin 88 extending through a hole in the threaded portion of the stud.

The invention being thus described and illustrated, what is claimed is:

1. A joint for interconnecting a pair of links or the like in a manner permitting limited universal movement therebetween, said joint comprising a ball member carried by one of said links and socket means for said ball member carried by the other of said links, said socket means including a pair of elements complementarily formed to provide the socket, said elements having portions embracing said other link in juxtaposed relation and means threaded on such link to secure said elements thereto.

2. A joint as defined by claim 1 where said portions comprise tangs accommodated in a slot in said other link and serving to prevent angular displacement of said elements relative to such link.

3. A joint as defined by claim 1 including a resilient member interposed between said portions and maintained in a compressed state by said means threaded on said other link.

4. A joint for interconnecting a pair of links or the like in a manner permitting limited universal movement therebetween, said joint comprising a ball member carried by one of said links and socket means for said ball member carried by the other of said links, said socket means including a pair of elements complementarily formed to provide the socket, said elements having cup-like portions encircling said other link in telescoped relation, resilient means confined between said portions and means threaded on said other link to secure said elements thereto and to maintain said resilient means in a state of compression.

5. A joint as defined by claim 4 where said portions comprise tangs accommodated in a slot in said other link and serving to prevent angular displacement of said elements relative to such link.

6. A joint for interconnecting a pair of links or the like in a manner permitting limited universal movement therebetween, said joint comprising a ball stud carried by one of said links with its axis normal to that of said link and socket means for the ball portion of said stud carried by the other of said links, said socket means including a pair of elements complementarily formed to provide the socket, said elements having portions embracing said other link in juxtaposed relation and means threaded on such link to secure said elements thereto.

7. A joint as defined by claim 6 where said portions comprise tangs accommodated in a slot in said other link and serving to prevent angular displacement of said elements relative to such link.

8. A joint as defined by claim 6 where there is disposed between said portions a resilient member maintained in a compressed state by said means threaded on said other link.

9. A joint for interconnecting a pair of links or the like in a manner permitting limited universal movement therebetween, said joint comprising a ball stud carried by one of said links with its axis normal to that of such link and socket means for the ball portion of said stud carried by the other of said links, said socket means including a pair of elements complementarily formed to provide the socket, said elements having cup-like portions encircling said other link in telescoped relation, resilient means interposed between said cup-like portions and means threaded on said other link to secure said elements thereto and to maintain said resilient means in a state of compression.

10. A joint as defined by claim 9 where said portions comprise tangs accommodated in a slot in said other link and serving to prevent angular displacement of said elements relative to such link.

References Cited in the file of this patent
UNITED STATES PATENTS
845,513    Bullard _____ Feb. 26, 1907